March 25, 1941.    W. B. CROSS    2,236,469
CORN SHOCK CART
Filed April 25, 1940    2 Sheets-Sheet 1
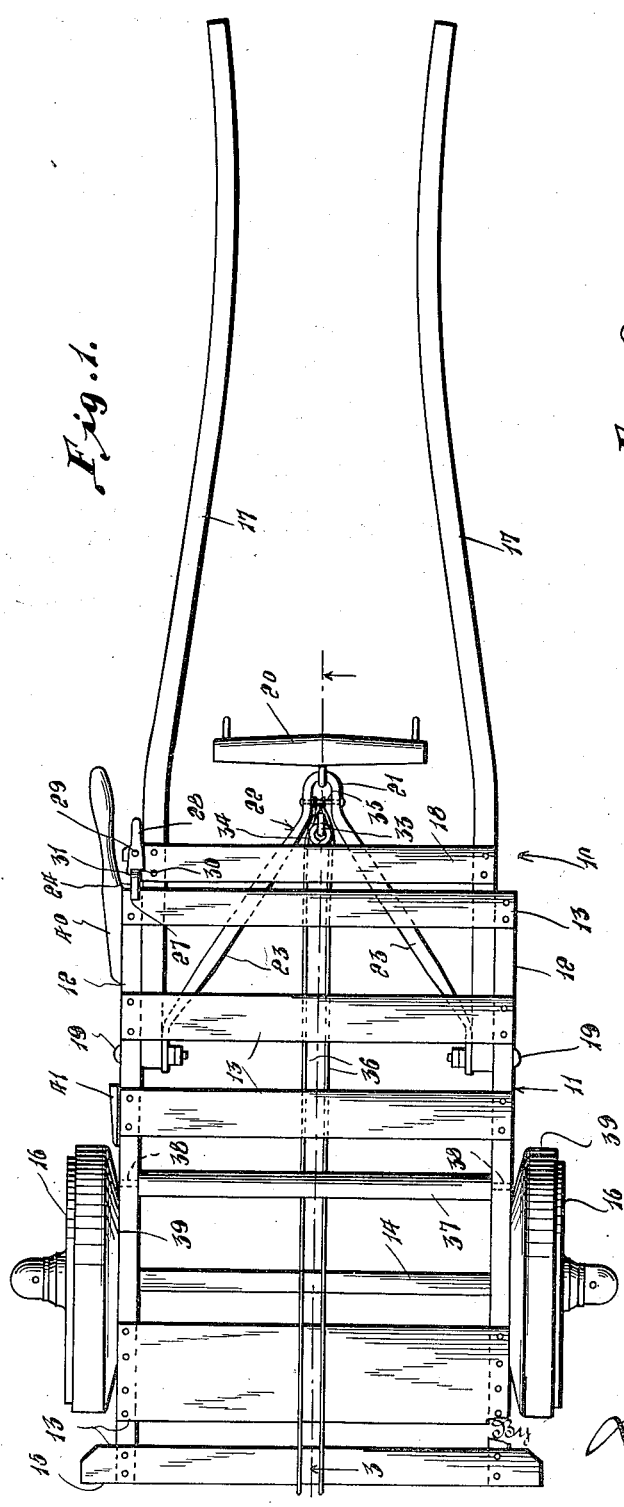
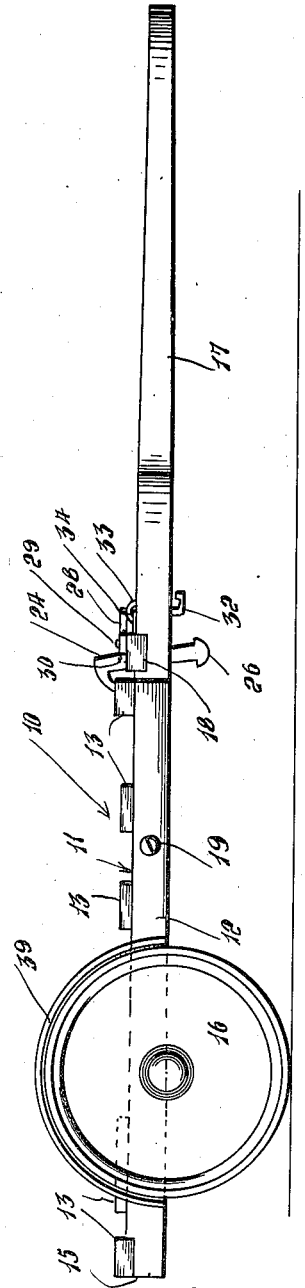
Inventor
W. B. Cross March 25, 1941.  W. B. CROSS  2,236,469
CORN SHOCK CART
Filed April 25, 1940   2 Sheets-Sheet 2
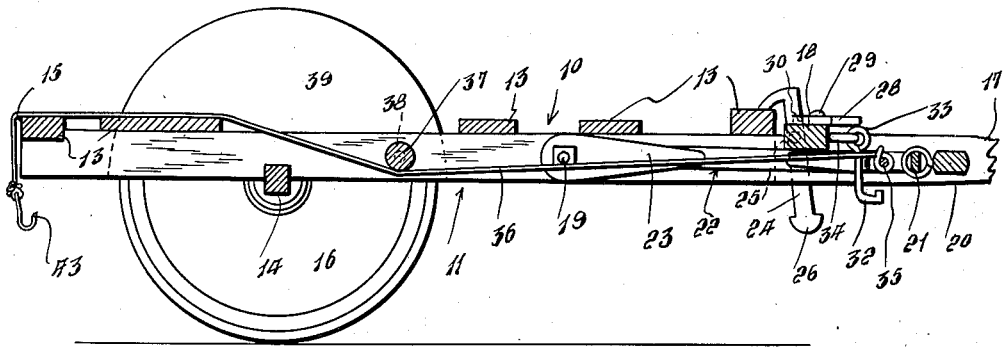
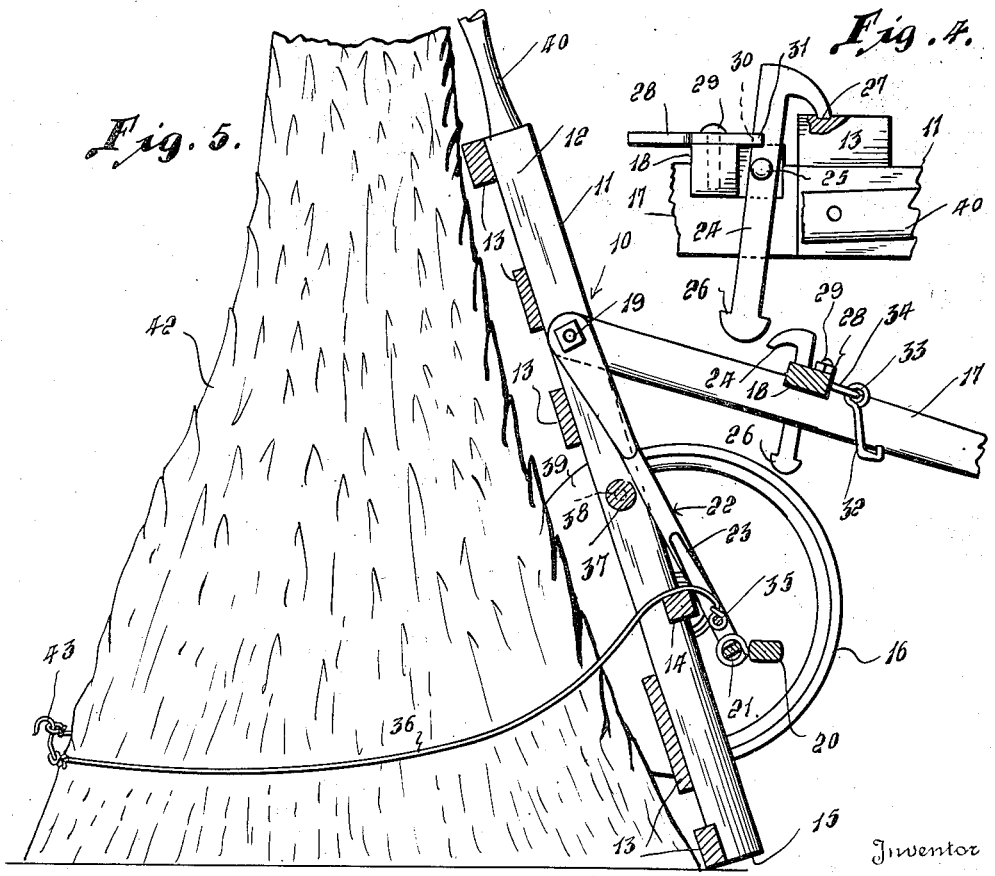
Inventor
W. B. Cross
By L. F. Randolph
Attorney Patented Mar. 25, 1941

2,236,469

UNITED STATES PATENT OFFICE 2,236,469

CORN SHOCK CART

Willie B. Cross, Racine, Ohio

Application April 25, 1940, Serial No. 331,663

9 Claims. (Cl. 214—66)

This invention relates to an improved cart for conveying corn shocks from the field and for delivering the shocks in an upright position.

More particularly, it is an aim of this invention to provide an improved cart for conveying shocks whereby a shock may be loaded, conveyed and unloaded while remaining intact and when unloaded will be deposited in an upright position and thereby protected from the elements in the same manner as while standing in the field.

Still another particular aim of the invention is to provide a cart for conveying shocks which may be drawn by a single horse and operated by one man to handle corn shocks more easily and quickly than where the shocks are conveyed on a two horse wagon with two attendants.

Still a further object of the invention is to provide an improved cart for conveying corn shocks intact so that the hauling may be done in all sorts of weather which is not possible when the shock is separated for loading and unloading.

Still a further advantage of the invention resides in the fact that the field adjacent the point at which the shock was standing is left clean due to the fact that the shock was not opened in loading the cart.

Other objects and advantages of the invention will hereinafter become more fully apparent from the following description of the drawings, which illustrates a preferred embodiment thereof, and wherein—

Figure 1 is a top plan view showing the cart in position ready to be drawn by a horse.

Figure 2 is a side elevational view of the same, on a smaller scale.

Figure 3 is a longitudinal vertical sectional view, on an enlarged scale, taken substantially along the plane of the line 3—3 of Figure 1, Figure 4 is an enlarged fragmentary side elevational view showing the latch means for securing the cart body relatively to the shafts, and Figure 5 is an enlarged vertical sectional view showing the cart body in an upturned position against a corn shock.

Referring more particularly to the drawings, wherein like reference characters designate like or corresponding parts throughout the different views, 10 designates generally the corn shock cart which includes a body 11 formed of corresponding side rails 12 connected by means of a plurality of transverse slats 13 which are disposed in spaced apart relationship relatively to each other. An axle 14 is secured to the body 11 adjacent its rear end 15. Axle 14 is disposed transversely of the body with its ends extending beyond the side rails 12 for rotatably mounting the ground wheels 16 by means of which the body 11 is supported.

A pair of shafts 17 are connected adjacent their rear ends by means of a cross brace 18 and are pivotally connected at their rear ends to the body 11 adjacent its forward end by means of the bolts 19 which extend inwardly through the side rails 12. As best seen in Figure 1, the rear ends of the shafts 17 are pivotally mounted on the inner sides of the side rails 12. A singletree 20 is pivotally connected to the intermediate U-shaped portion 21 of a support 22 which is provided with the corresponding diverging arms 23, the terminals of which are disposed substantially parallel to each other. The terminals of the arms 23 are pivotally mounted on the inner adjacent ends of the bolts 19 to pivotally mount the support 22 between the pair of shafts 17.

Referring particularly to Figure 4, a hook 24 is pivotally connected to one end of the brace 18 by means of a pivot pin 25 which extends through the shank of the hook 24 intermediate of its ends. The lower shank end of the hook 24 is enlarged to form the weighted end 26. The upper hooked end of the hook 24 is adapted to be swung toward the rear end of the cart 10 to engage a recess 27 in the upper side of the forwardmost slat 13 to retain the pair of shafts 17 in substantially the same plane as the body 11. As seen in Figure 4, when the bill of the hook 24 is disposed in the recess 27 the shank of the hook is disposed at an incline so that the weighted end 26 will tend to swing the opposite end of the hook 24 upwardly and out of engagement with the recess 27. A lever 28 is pivotally connected, intermediate of its ends, to the upper side of the cross brace 18 by a pin 29 and is provided with a cam edge 30 at one end, as best seen in Figure 1, for engaging the back edge of the shank of the hook 24 for retaining the bill of the hook in the recess 27. A lug projects from one end of the cam edge 30 to form a stop 31 to prevent the lever 28 from being swung in one direction past the position, as seen in Figure 1. It will thus be seen that by pulling the opposite, forward or handle end of the lever 28 toward the center of the cart 10 the hook 24 will be released to swing out of engagement with the recess 27 and to permit the body 11 to be rocked relatively to the shafts 17 and when the shafts 17 are in position relatively to the body 11, as seen in Figure 2, the forward or handle end of the lever 28 can be swung in the opposite direction to urge the bill of the hook into engagement with the recess 27 and to latch it in this position to thereby hold the shafts in a secured position relatively to the body 11.

A hook 32, as best seen in Figures 2 and 5, is provided with an eyelet 33 in its shank end which is pivotally connected to an eyelet 34 secured in the forward side of the brace 18, intermediate of its ends. The hooked end of the hook 32 is adapted to detachably engage a bar 35 which extends through and is secured to the legs of the U-shaped portion 21 to support the forward end of the singletree support 22 and to thereby retain it between the pair of shafts 17 and in substantially the plane as the shafts, when a horse is not hitched to the cart 10.

A rope, cord or other tie 36 is secured intermediate of its ends to the bar 35 and extends rearwardly along the underside of the body 11 and upwardly between two of the slats 13 which are disposed adjacent the axle 14. A roller 37 is provided with restricted ends 38 which are journaled in the side rails 12 for mounting the roller 37 therebetween and between the slats 13 through which the rope or tie 36 extends. Roller 37 is positioned beneath the slats 13 so that the cord or tie 36 is trained thereunder, as best seen in Figure 3, for a purpose which will hereinafter become apparent.

Wheel guards 39 are secure to the outersides of the rails 12 to enclose the upper portions of the treads of the ground wheels 16 and the upper portions of their inner sides. A handle 40 is secured to the outer side of one of the rails 12, adjacent its forward end and extends forwardly therefrom. The handle 40 is disposed on the same side of the cart 10 as the hook 24 and latch lever 28.

A corn cutting knife sheath is secured to one side of the body 11 for holding a knife, not shown.

From the foregoing it will be obvious that the cart 10 is adapted to be drawn by a horse hitched to the shafts 17 and the singletree 20. Cart 10 is adapted to be backed up to a position adjacent to a corn shock, as seen at 42, in Figure 5, at which time the lever 28 is actuated to release the hook 24. Handle 40 is then grasped to swing the forward end of the body 11 upwardly to cause the rear end 59 to engage the ground close to the shock 42. The cart 10 is then backed to rock the body 11 on its rear end 15 to raise the wheels 16 out of engagement with the ground and to cause the body 11 to rock vertically past a perpendicular position and into position against the upright shock 42, as seen in Figure 5. During this movement the shafts 17 will remain in substantially a horizontal position so that the body 11 will swing relatively thereto. The singletree support 22 will swing downwardly against the axle 14. The ends of the rope or tie 36, one end of which is preferably provided with a hook 43, are then attached around the lower enlarged end of the shock 42. The cart 10 is then drawn forward which first causes the support 22 to swing upwardly to tighten the tie 36 around the lower end of the shock 42 after which the cart body 11 rocks forwardly and back onto its wheels 16 to uproot the shock 42 and position it on the body 11, which is swung back to substantially a horizontal position, as seen in Figure 3, by pulling downwardly on the handle 40. The forward end of the body is then latched to the shafts 17 by the hook 24. The support 22, being in the position, as seen in Figure 3, will retain the tie 36 tightly around the shock 42. The tie is protected from frictional wear by engagement with the roller 37.

The shock thus positioned can be conveyed to its unloading point and in transit will be protected from the ground wheels 16 by the guards 39. To unload the shock hook 24 is released and the cart 10 is then upturned on its rear end 15, in the same manner as heretofore described to set the shock 42 upright on its enlarged end and to release the tension on the tie 36 which can then be readily detached after which the cart is free to be moved away from the shock and returned to its position, as seen in Figure 3. It will thus be seen that the shock 42 is loaded, conveyed and unloaded intact and that these operations can be readily performed by one man. The ground wheels 16 are so positioned relatively to the body 11 that the weight of the shock 42 will be substantially balanced thereon.

The sheath 41 provides means for carrying a knife which may be used for cutting off the roots of the shock 42 after it is positioned on the cart and before it is conveyed from the field so that the bottom of the shock will be flat and capable of readily standing on end when unloaded.

Various modifications and changes in the construction and arrangement of the parts forming the invention are contemplated and may obviously be resorted to as only a preferred embodiment of the invention has been illustrated and described.

I claim as my invention:

1. A shock conveying cart comprising a body formed of spaced side rails connected by spaced transverse slats, a pair of shafts pivotally connected to the inner sides of the side rails, adjacent their forward ends, and extending forwardly therefrom, a latch member carried by said shafts for engaging the cart body for retaining the shafts in substantially the same plane as the body when in an extended position relatively thereto, a singletree support pivotally connected at the same point with said shafts to the side rails and disposed between the shafts to swing relatively to the shafts and body, latch means for supporting said singletree support in substantially the same plane as the shafts, a tie secured to the free end of said singletree support and extending along the underside of the body and upwardly therethrough adjacent its rear end, ground wheels disposed at the sides of said body and adjacent its rear end, said latch means being operable to release the shafts and singletree support to permit the cart body to be upturned rearwardly to position it against the shock and to allow the singletree support to swing downwardly to enable the tie to be attached around the shock and drawn tight therearound when the singletree support is raised for securely tying the shock on the cart and for thereafter drawing the cart forwardly and swinging the cart body back to substantially a horizontal position.

2. A cart as in claim 1, comprising a roller journaled between the side rails of said body and under which said tie is trained for tensioning the tie as the singletree support is swung toward the forward end of the body.

3. A cart as in claim 1, comprising wheel guards, secured to the outer sides of said side rails and covering the inner sides of the upper portions of the ground wheels for holding the shock out of engagement therewith.

4. A cart as in claim 1, comprising a handle projecting from the forward end of the body for swinging said forward end upwardly to position the body to be upturned to rest on its rear end when the cart is backed.

5. A load securing means for a shock conveying cart of the two wheeled type which is adapted to be upturned for loading or unloading a shock, comprising a pair of shafts pivotally connected to the cart body intermediate of its ends, a singletree support pivotally connected to the cart body to swing relatively to the body and shafts, a flexible tie attached to the free end of the singletree support for engaging around a shock and for securing the shock to the body when said support is swung upwardly and forwardly relatively to the cart body and shafts, and means for latching the free end of the singletree support to the shafts.

6. A load securing means for a shock conveying cart of the two wheeled type which is adapted to be upturned for loading or unloading a shock, comprising a pair of shafts pivotally connected to the cart body intermediate of its ends, a singletree support pivotally connected to the cart body to swing relatively to the body and shafts, a flexible tie attached to the free end of the singletree support for engaging around a shock and for securing the shock to the body when said support is swung upwardly and forwardly relatively to the cart body and shafts, means for latching the shafts to the forward end of the body to hold the shafts in an extended position relatively thereto, and a latch member for connecting the free end of the singletree support to the shafts.

7. A shock conveying cart comprising a two wheel cart body, said body being adapted to be upturned for loading and unloading a shock, a flexible tie for engaging around the shock for securing it to the cart body, shafts pivotally connected to the cart body, and means swingably mounted relatively to the cart body and shafts and connected to the tie for tightening the tie around the shock.

8. A shock conveying cart comprising a two wheel cart body, said body being adapted to be upturned on its rear end for loading and unloading a shock, said rear end of the cart body extending rearwardly beyond the rearmost portions of the wheels for engaging the ground for supporting the cart, when in an upturned position, and with the wheels in an elevated position to provide means thereby for more readily positioning the cart in an upturned or in a horizontal position, a flexible tie for engaging around the shock for securing it to the cart body, shafts pivotally connected to the cart body, between its forward end and the ground wheels, and a singletree support swingably connected to the cart body and swingably mounted relatively to the body and shafts, said singletree support being connected to the tie at its free end for tightening the tie around the shock.

9. A shock conveying cart as in claim 8, comprising a transversely disposed member connected to the cart between its rear end and the point where the shafts are pivotally mounted thereon, and around which said tie extends, and latch means for connecting the singletree support to the shafts whereby a swinging movement of the shafts relatively to the cart body will tighten or loosen said tie.

WILLIE B. CROSS.